(12) United States Patent
Levy et al.

(10) Patent No.: US 8,351,587 B2
(45) Date of Patent: Jan. 8, 2013

(54) METHOD AND APPARATUS FOR AUTOMATIC NOTIFICATION OF CONFERENCE STATUS

(75) Inventors: Jacqueline Levy, Sunnyvale, CA (US); Michael Sharland, Santa Clara, CA (US); Jay Maskell, Morgan Hill, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1639 days.

(21) Appl. No.: 11/136,113

(22) Filed: May 24, 2005

(65) Prior Publication Data

US 2006/0285672 A1 Dec. 21, 2006

(51) Int. Cl.
*H04M 3/42* (2006.01)
*H04L 12/16* (2006.01)

(52) U.S. Cl. ............. 379/202.01; 379/158; 379/207.01; 379/210.01; 370/260

(58) Field of Classification Search ............. 379/202.02, 379/203.01, 204.01, 205.01, 206.01, 207.01, 379/207.11, 158, 211.01–211.03, 207.02, 379/210.01, 265.01–265.14; 370/260
See application file for complete search history.

(56) References Cited

U.S. PATENT DOCUMENTS

| | | | | |
|---|---|---|---|---|
| 6,097,804 | A * | 8/2000 | Gilbert et al. | 379/230 |
| 6,801,610 | B1 * | 10/2004 | Malik | 379/202.01 |
| 7,317,716 | B1 * | 1/2008 | Boni et al. | 370/352 |
| 7,440,565 | B2 * | 10/2008 | McLarty et al. | 379/211.02 |
| 7,467,190 | B2 * | 12/2008 | Matsubara et al. | 709/219 |
| 8,224,896 | B2 * | 7/2012 | Knight et al. | 709/204 |
| 2002/0085701 | A1 * | 7/2002 | Parsons et al. | 379/211.01 |
| 2003/0002645 | A1 * | 1/2003 | Worsham et al. | 379/211.03 |
| 2003/0020623 | A1 * | 1/2003 | Cao et al. | 340/686.6 |
| 2003/0217099 | A1 * | 11/2003 | Bobde et al. | 709/202 |
| 2004/0161080 | A1 * | 8/2004 | Digate et al. | 379/88.17 |
| 2004/0199580 | A1 * | 10/2004 | Zhakov et al. | 709/204 |
| 2005/0018826 | A1 * | 1/2005 | Benco et al. | 379/202.01 |
| 2005/0027581 | A1 * | 2/2005 | Kjesbu et al. | 705/8 |
| 2005/0041793 | A1 * | 2/2005 | Fulton et al. | 379/211.01 |
| 2005/0050061 | A1 * | 3/2005 | Karstens | 707/100 |
| 2006/0067250 | A1 * | 3/2006 | Boyer et al. | 370/260 |
| 2006/0203970 | A1 * | 9/2006 | Jorasch et al. | 379/32.01 |
| 2006/0224430 | A1 * | 10/2006 | Butt | 705/8 |
| 2007/0097886 | A1 * | 5/2007 | Schwagmann et al. | 370/260 |
| 2007/0192410 | A1 * | 8/2007 | Liversidge et al. | 709/204 |

* cited by examiner

*Primary Examiner* — William Deane, Jr.

(57) ABSTRACT

A telecommunications device including a notification set-up unit associated with a user device; an access control unit configured to receive notification configuration information from said notification set-up unit and provide notification to said user device of a pending conference in accordance with said notification configuration information.

20 Claims, 6 Drawing Sheets

METHOD AND APPARATUS FOR AUTOMATIC NOTIFICATION OF CONFERENCE STATUS

BACKGROUND OF THE INVENTION

1. Field of the Invention

The present invention relate to telecommunications systems and, in particular, to an improved teleconferencing system.

2. Description of the Related Art

Modern telecommunications systems allow users to define workgroups, i.e., groups of workers involved in a specific project. Workgroup members often communicate with some or all of each other using voice and/or web conferences.

A workgroup member may be provided with a telecommunication portal that allows the user to join a workgroup and see the status of a voice and/or web conference associated with such a workgroup. However, if the user is not viewing the web portal or using one of the telephony applications he may not be aware of the voice and web conference and may not be aware he is missing an important conference.

SUMMARY OF THE INVENTION

These and other drawbacks in the prior art are overcome in large part by a system and method according to embodiments of the present invention.

A telecommunications system according to embodiments of the present invention includes a notification set-up unit associated with a user device; and an access control unit configured to receive notification configuration information from said notification set-up unit and provide notification to said user device of a pending conference in accordance with said notification configuration information.

A telecommunications method in accordance with embodiments of the present invention includes providing notification configuration information from a user device to a notification controller, said notification configuration information identifying requirements for a pending conference; and notifying said user device via a messaging application in accordance with said notification configuration information.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF EMBODIMENTS OF THE INVENTION

Figure 1A:
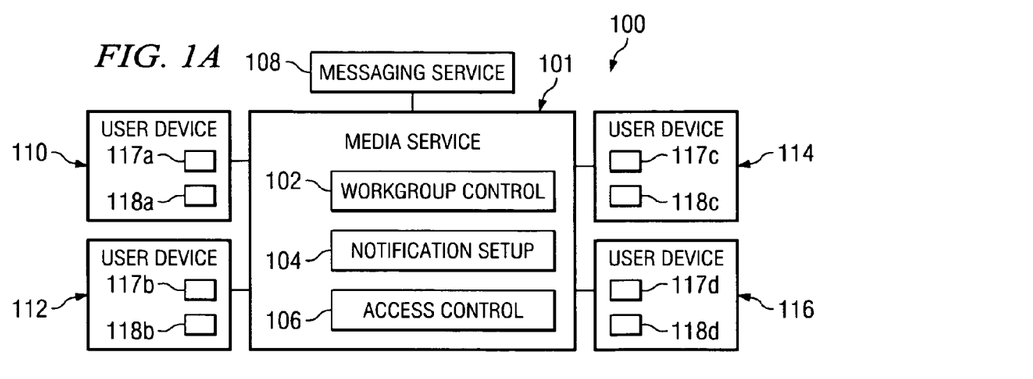
FIG. 1A is a diagram schematically illustrating a system according to embodiments of the present invention.

Turning now to the drawings and, with particular attention to FIG. 1, a diagram of a telecommunications system 100 according to an embodiment of the present invention is shown. The system includes a media service or server 101 connected to or in communication with a messaging service 108. The messaging service 108 may include, for example, e-mail, Short Message Service (SMS), pager, Instant Messaging (IM), Web Portal pop-up, or voice messaging. The media service 101 may include a workgroup control unit 102, a notification setup unit 104, and an access control unit 106. The media service 101 may implement or be in communication with one or more devices that implement teleconferencing services, such as those of a multipoint control unit or conferencing bridge.

User devices, such as user devices 110, 112, 114, 116 may be operably coupled to or in communication with the media service 101 and the messaging service 108. In some embodiments, a user device may be or include such things as telephones, cellular telephones, PDAs, computers, etc. For example, the user devices 110, 112, may be personal computers implementing the Windows XP™ operating system and the Windows Messenger™ instant messenger system. In addition, the user devices 114, 116 may include telephony and other multimedia messaging capability using, for example, peripheral cameras, Webcams, microphones and speakers (not shown) or peripheral telephony handsets, such as the Optipoint™ handset available from Siemens Information and Communication Networks.

The user devices may be equipped with server access portals 118a-118d, respectively, for communicating with the media service 101, as will be explained in greater detail below. In accordance with embodiments of the present invention, the server access portals 118a-118d may be used to set particular notification conditions for accessing teleconferences (i.e., a teleconference "tell me when"). In certain embodiments, the server access portals may be embodied as web browsers. In addition, one or more of the user devices may be equipped with messaging applications 117a-117d.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

The workgroup control unit 102 may be used to define workgroups, associating a plurality of the users in one or more workgroups. The workgroup control unit 102 may provide or include an application interface that allows a user or administrator to define and manage workgroups, i.e., specifying workgroup members and workgroup specific functions. Applications may monitor, access, and/or query the workgroup control unit 102 for workgroup-related information. The workgroup control unit 102 may be implemented in hardware and/or software operating on one or more servers, computer systems, host or mainframe computers, workstations, etc. In some embodiments, the workgroup control unit 102 may be operating on some or all of the same devices as other components in the system 100.

The notification setup unit 104 may be or include an application that receives notification setup parameters from user devices 110, 112, 114, 116. That is, the notification setup unit 104 can receive parameters such as callback, activation, contact medium, and the like. In addition, the notification setup unit 104 can interface to receive the notification parameters through a variety of input systems, such as web browsers, interactive voice response, or voice recognition input systems. The notification setup unit 104 may be implemented in hardware and/or software operating on one or more servers, computer systems, host or mainframe computers, workstations, etc. In some embodiments, the notification setup unit 104 may be operating on some or all of the same devices as other components in the system 100.

The access control unit 106 accesses the workgroup control unit 104 for the appropriate notification information while a conference is ongoing, and causes the appropriate message or notification to be sent to the user. In certain embodiments, the access control unit 106 causes the messaging unit 108 to send an appropriate Tell Me When message. In other embodiments, the access control unit 106 can automatically attempt a call out to the user at a specified number. The access control unit 106 may be implemented in hardware and/or software operating on one or more servers, computer systems, host or mainframe computers, workstations, etc. In some embodiments, the access control unit 106 may be operating on some or all of the same devices as other components in the system 100.

An exemplary server environment capable of being adapted for use in a system according to embodiments of the present invention is the OpenScape system, available from Siemens Information and Communication Networks, Inc. Such an environment can be implemented, for example, in conjunction with Windows Server, Microsoft Office Live Communications Server, Microsoft Active Directory, Microsoft Exchange and SQL Server.

Figure 1B:
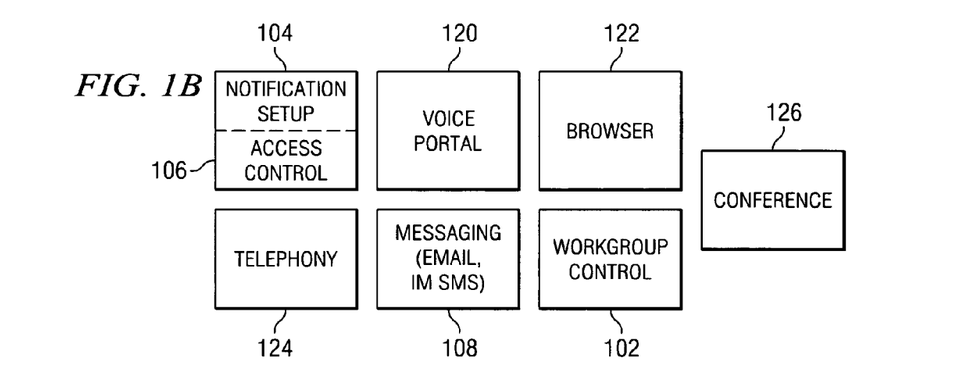
FIG. 1B is a block diagram illustrating an exemplary media service or server in accordance with an embodiment of the present invention.

A block diagram illustrating several components of a server in accordance with embodiments of the present invention is shown in FIG. 1B. As shown, the server environment can include, be operably coupled to or in communication with, a voice portal 120, a browser portal 122, a messaging portal (text, e-mail, instant messaging, SMS, etc.) 108, a telephony portal 124, conferencing (audio and/or multimedia) 126, and workgroup portal 102.

The voice portal 120 provides user access to groupware features via the telephone. The voice portal 120 may be implemented, for example, as an interactive voice response (IVR) system capable of receiving voice and/or DTMF inputs. The Workgroup Portal 102, which may be implemented as a browser interface, allows users to initiate audio or multi-media conferencing sessions and view documents that have been checked in to the Workgroup Repository (not shown). The conferencing module 126 allows the user to set up audio or multimedia conference sessions. The telephony module 124 allows the server 101 to act as a telephony feature provider/switch. The messaging portal 108 may be implemented as one or more text or multimedia messaging systems, such as e-mail, Instant Messaging, or Short Messaging Service (SMS).

Figure 2:
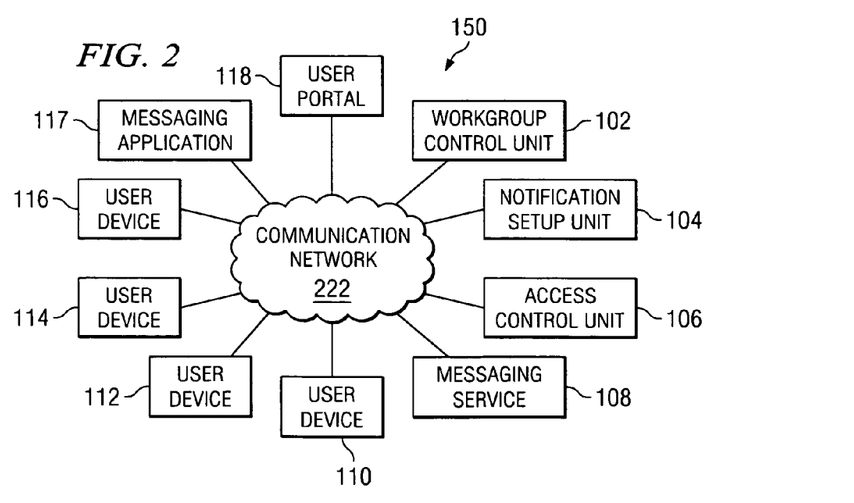
FIG. 2 is a diagram schematically illustrating a system according to embodiments of the present invention.

In certain embodiments of the present invention, one or more of the components of the system 100 may be connected to or in communication with each other via a communication network. For example, turning now to FIG. 2, a system 150 including various components of the system 100 is illustrated, wherein some or all of the components are in communication via a network 222. The network 222 may be or include the Internet, World Wide Web, a local area network, or some other public or private computer, cable, telephone, client/server, peer-to-peer, or communication network or intranet. In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 222 may be implemented using a TCP/IP network and may implement voice or multimedia over IP using, for example, the Session Initiation Protocol (SIP).

Figure 3:
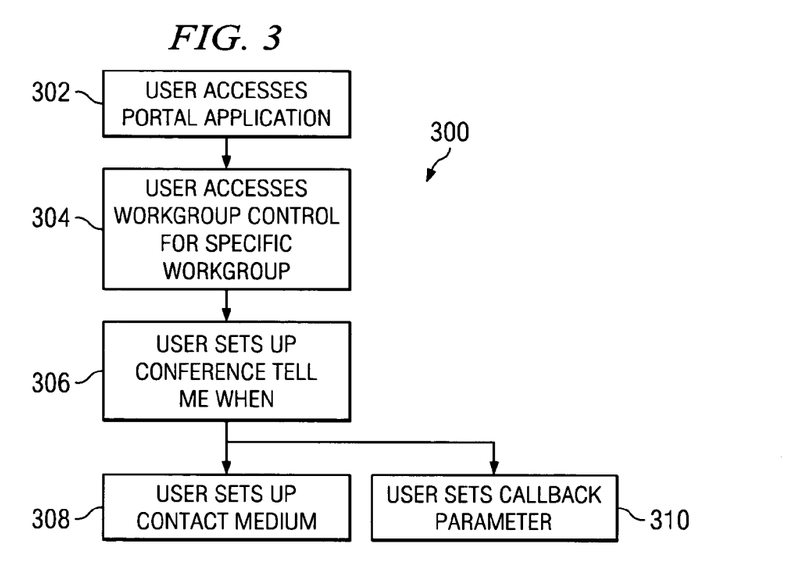
FIG. 3 is a flowchart illustrating operation of an embodiment of the present invention.

Turning now to FIG. 3, a flowchart 300 illustrating operation of an embodiment of the present invention is shown. The particular arrangement of elements in the flowchart 300 is not meant to imply a fixed order to the elements; embodiments can be practiced in any order that is practicable.

In particular, flowchart 300 illustrates user setting of "tell me when" options via a user portal such as a web browser portal 120 or an interactive voice response unit with DTMF or voice input capabilities 122. In a step 302, the user accesses his portal application 118. In a step 304, the user can access a workgroup control 102 for the appropriate workgroup. For example, the portal application 118 can communicate with the media service 101 to display a dropdown menu allowing selection of the specific workgroup, via the workgroup control unit 102. In a step 306, the user can set up the conference "tell me when" parameters via the notification setup unit 104. For example, the user can set whether the "tell me when" is a one time only or permanent or ongoing tell me when. That is, the user can specify whether he is to be sent a "tell me when" whenever a conference is begun for the group and he is not present or only once (e.g., for the next conference, or at a specific time and date). Similarly the user can specify the "busy" telephone number, i.e., the number the user is expected to be at for the conference; if the user does not pick up, then the tell me when will be sent. Finally, in a step 308, the user can set up a contact medium or messaging application 117 for receiving the tell me when. For example, if the user is at his desk, he can specify that the tell me when should be received via an Instant Messaging application or via a web browser pop up, e-mail, voice message, or other medium. In addition, in certain embodiments, the user can specify a non-desktop medium, such as SMS, pager, and the like. The information is then saved in the appropriate server or server-connected memory location. In addition, or alternatively, in a step 310, the user can set one or more callback parameters. For example, could identify a telephony application associated with his computer, or a telephone number of a desktop or cellular telephone on which to receive one or more callbacks after a predetermined period has elapsed.

Figure 4:
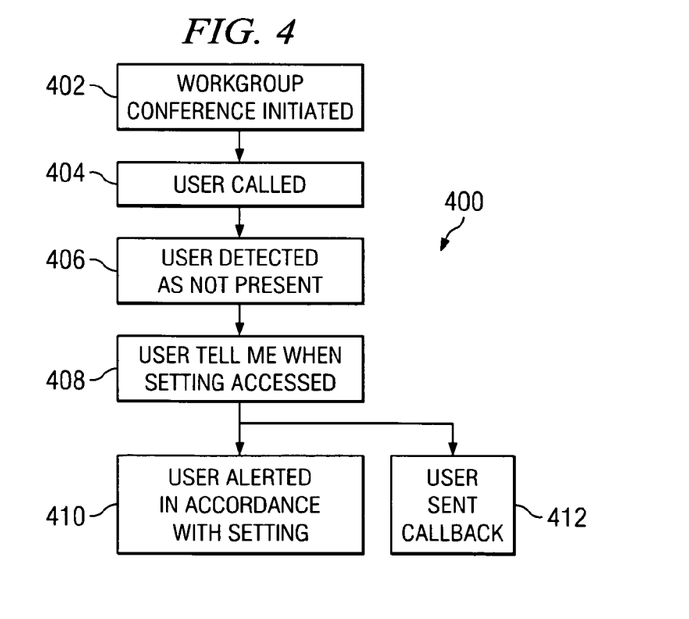
FIG. 4 is a flowchart illustrating operation of an embodiment of the present invention.

Turning now to FIG. 4, a flowchart 400 illustrating operation of an embodiment of the present invention is shown. The particular arrangement of elements in the flowchart 400 is not meant to imply a fixed order to the elements; embodiments can be practiced in any order that is practicable.

In particular, flowchart 400 illustrates using the conference "tell me when" to join a conference. In a step 402, a workgroup member (or other person) can initiate a teleconference via the workgroup control 102 and conference unit 126. For example, a conference host can cause the server 101 to call out to all members of the workgroup (e.g., using the telephony control unit 124) and perform any necessary mixing, etc., for conduct of the conference. In a step 404, the user will be called. In a step 406, the user can be detected as not being present. For example, the telephone line at which the user is called can be detected as being busy or not active by the access control unit 106, in communication with the telephony unit 124. In a step 408, the server 101's access control unit 106 can then access the user's "tell me when" settings. In a step 410, the user can be sent an alert message in accordance with the setting. For example, in certain embodiments, the server 101 will access and read the "tell me when" setting and identify the alert medium, i.e., the messaging application 108. The server 101 can then activate or communicate with the appropriate alerting medium or messaging application 108, and send a message to the user. Alternatively, in a step 412, one or more attempts to call back the user may be made using the stored number and the telephony service 124.

Figure 5:
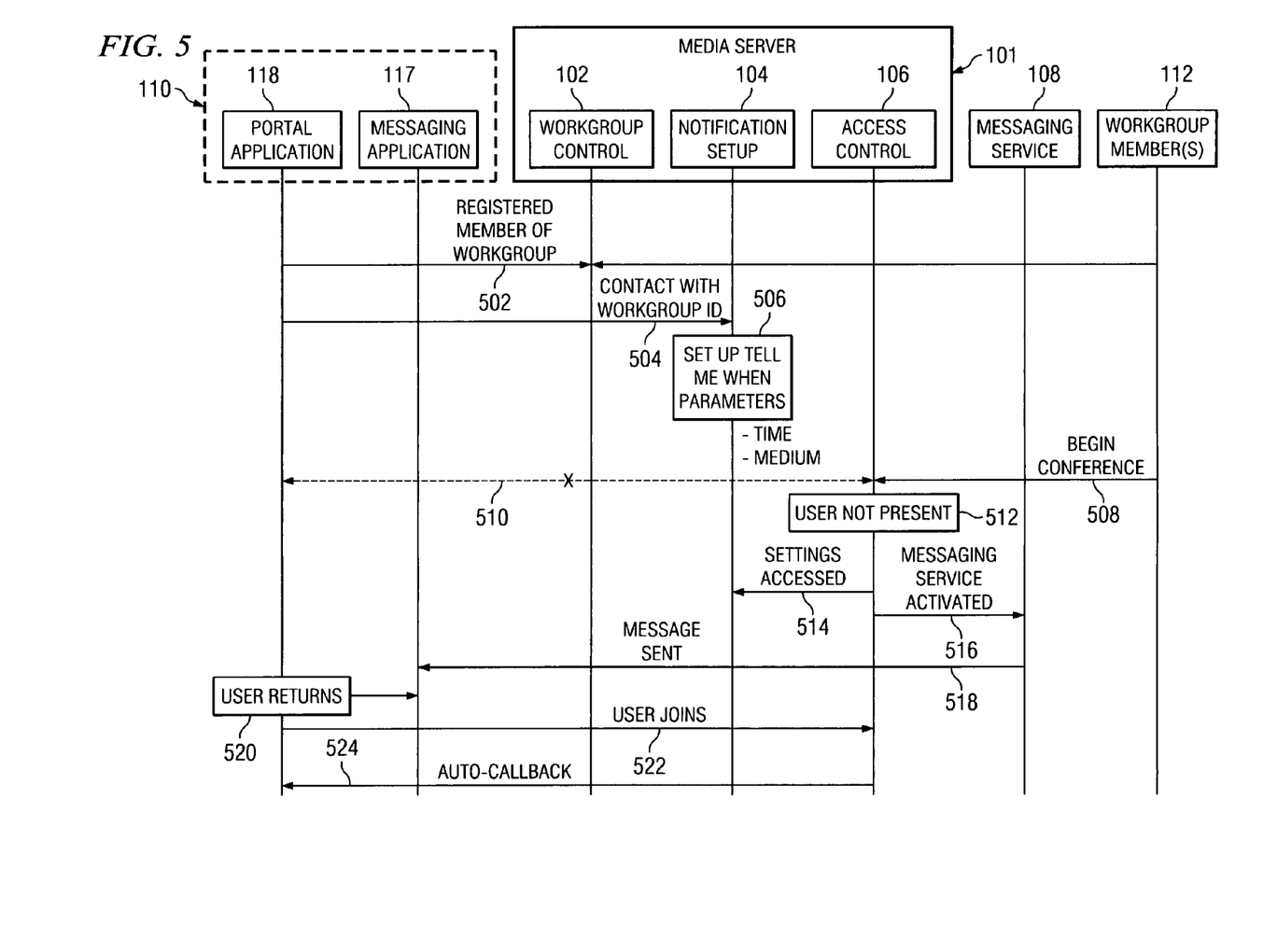
FIG. 5 is a diagram illustrating operation of an embodiment of the present invention.

Turning now to FIG. 5, a diagram schematically illustrating operation of an embodiment of the present invention is shown. The particular arrangement of elements in the diagram is not meant to imply a fixed order to the elements; embodiments can be practiced in any order that is practicable. In particular, the diagram of FIG. 5, illustrates interaction of the various components of the system.

Shown is a user device 110, which may be embodied as a personal computer and may include a portal application 118 and a messaging application 117. The portal application 118 may be or include a telephony application. Alternatively, a separate telephony application (not shown), such as a telephone, may be provided. Alternatively, the user device may be implemented, e.g., as a cellular telephone with SMS capabilities. Also shown is media server 101, which may implement a teleconferencing bridge, and which may include a workgroup control unit 102, notification setup unit 104, and access control unit 106. A messaging service 108 may also be provided. Finally, one or more other users, such as a workgroup member 112, may be provided.

At 502, the user 110 and other users 112 can configure or define membership in a workgroup, in conjunction with the workgroup control unit 102. At 504, the user 110 can communicate with the notification setup unit 104 to set up "tell me when" parameters and providing workgroup identification. As noted above, in some embodiments, the communication can be via a web browser 122 (FIG. 1B) or via an Interactive Voice Response 120 telephony type connection. At 506, in response to user input, the notification setup unit 104 will set the "call me back" parameters. As discussed above, these can include contact medium and place, as well as call back times, numbers, etc.

At 508, a workgroup member 112 can initiate a teleconference with the workgroup, via the server 101. At 510, the user 110 fails to be contacted. At 512, the access control unit 106 determines, or receives notice, that the user 110 is not present. Accordingly, the access control unit 106 communicates with the notification setup unit 104, at 514, to receive the user's "tell me when" settings. At 516, the access control unit 106 communicates with the messaging service 108 to generate and address the appropriate "tell me when" message. As discussed above, the "tell me when" medium could include Instant Messaging, Short Message Service, browser pop-up, e-mail, and the like.

At 518, the messaging service 108 sends the message to the user, such as to the user's messaging application 117 or browser. At 520, the user can return and check the message. Then, at 522, the user can either call in to join the conference (e.g., using a telephone or telephony application), or at 524, can simply wait and let the server call him back.

Figure 6A:
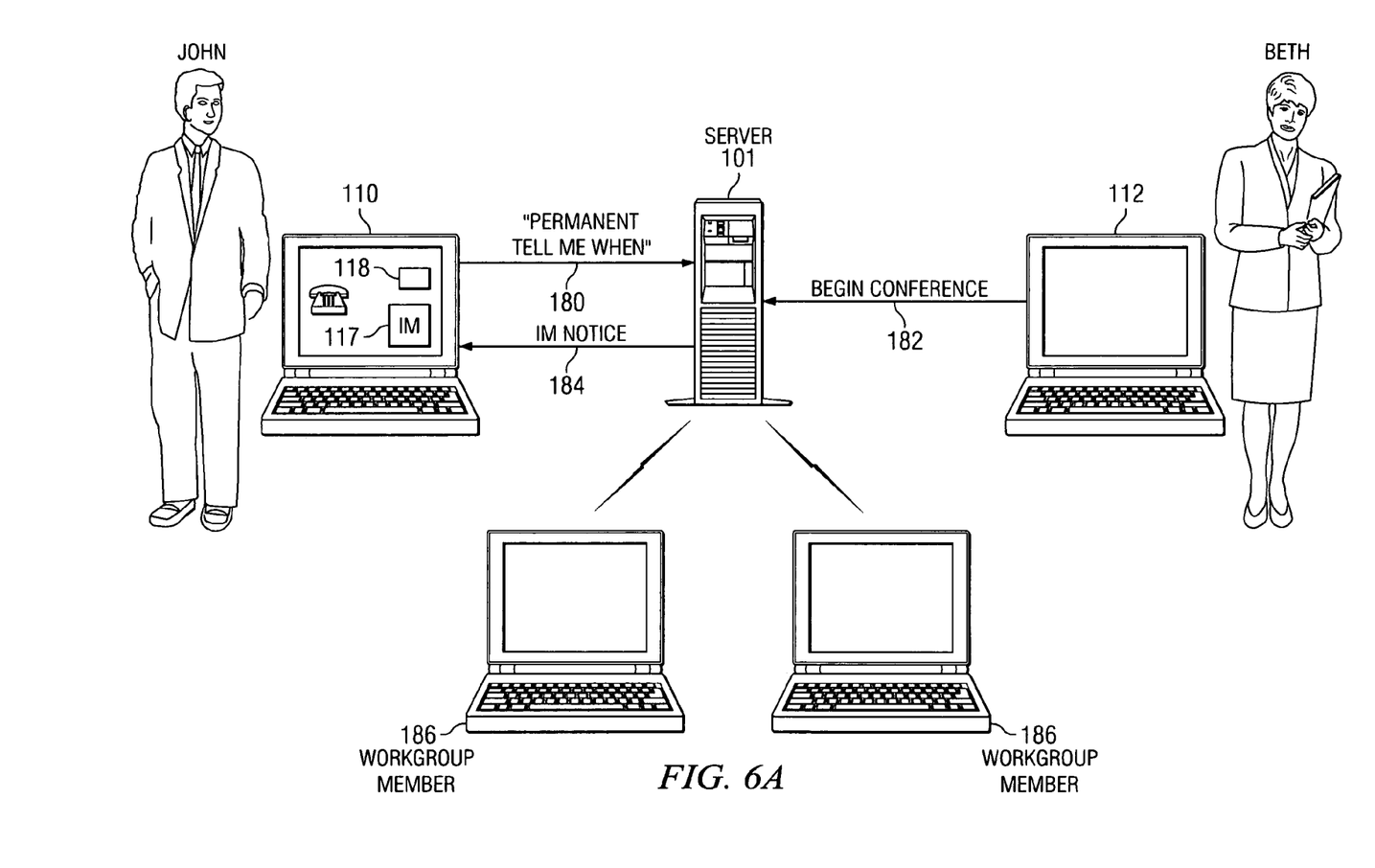
FIG. 6A and FIG. 6B illustrate exemplary operation of embodiments of the present invention.
Figure 6B:
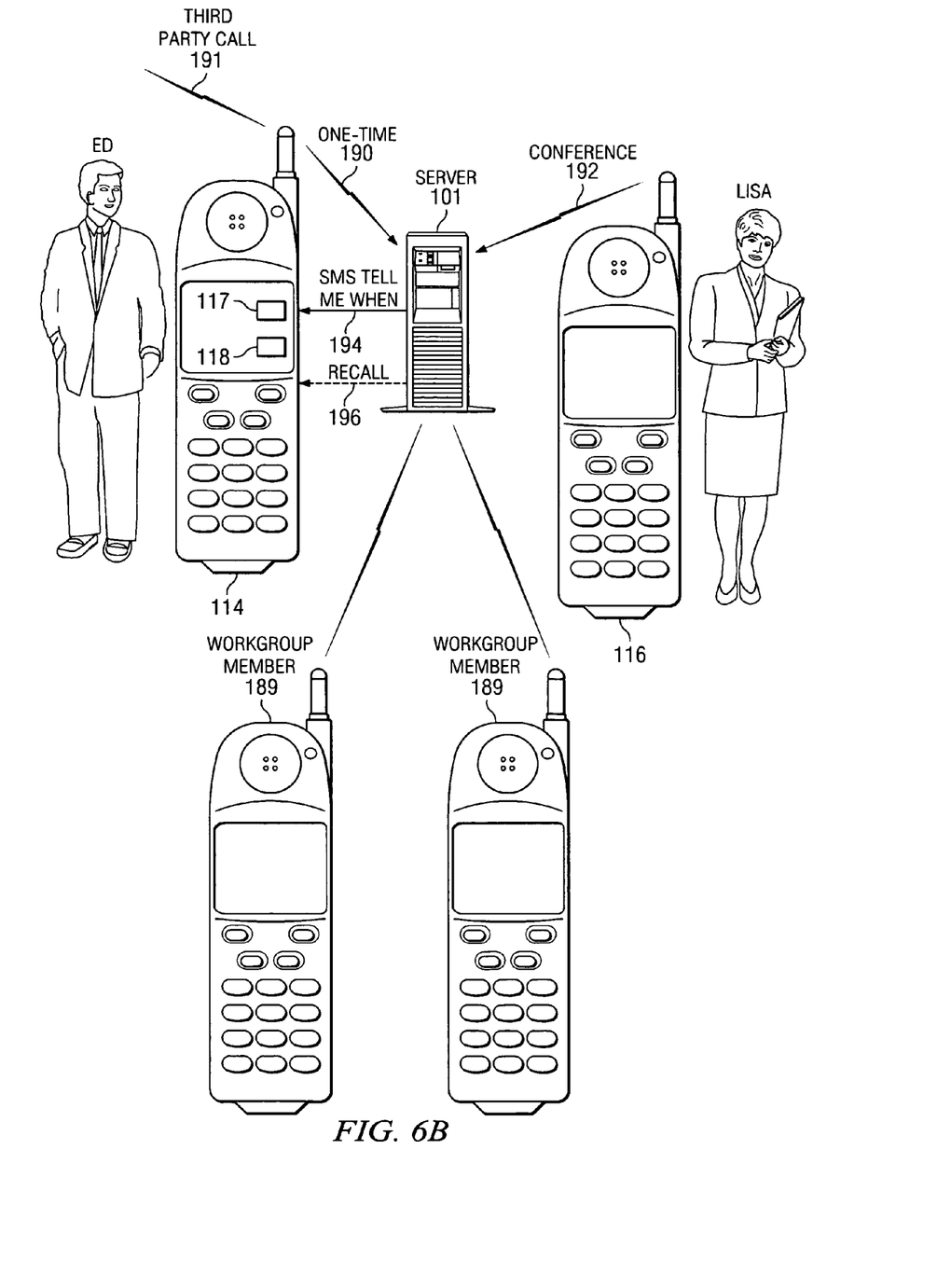

Operation of embodiments of the present invention is shown in FIG. 6A and FIG. 6B by way of example. In particular, FIG. 6A illustrates an exemplary user case with a web portal; FIG. 6B illustrates an exemplary user case employing a telephony or IVR portal.

Shown in FIG. 6A is server 101, and a user "John" with a personal computer 110. The personal computer 110 includes a messaging application 117 and a browser 118. Also shown is a user "Beth" and user device 112, and workgroup members 186. John and Beth may be members of the same workgroup. Using the portal 118, John can set a "permanent tell me when," as shown at 180, to ensure that he is always involved in team discussions. He can thus set up the "tell me when" to notify him via, for example, an IM whenever a voice conference begins for his workgroup.

When Beth starts a teleconference at 182, John misses the phone call because he is away from his desk. However, the server 101 (or the messaging system) sends the prescribed message, in this case, an IM 184. When John returns to his device 110, he sees the message and can call in to the conference.

FIG. 6B illustrates server 101, user Ed at device 114 with a portal 118 and messaging 117, user Lisa at device 116, and other workgroup members 189. For example, Ed may be a sales team workgroup member and be on the road a significant amount of time. He may know that the team is going to be having a conference on a particular date, but with the time not yet set. Accordingly, at 190, he may set a one time "tell me when" to send him an SMS message when the conference starts.

At 192, Lisa starts the conference. Ed may miss the start because he is talking on the phone with a third party, at 191. However, at 194, he receives the SMS indicating that the conference has begun. When he finishes his phone call, he can call in to the conference. Alternatively, in addition to or instead of the "tell me when" message, Ed can have set the "tell me when" to automatically call him back periodically, e.g., every three minutes. Then, when Ed sees the SMS message, or when he is finished with his call, he can simply wait for his phone to ring at 196, joining him to the conference.

Figure 7:
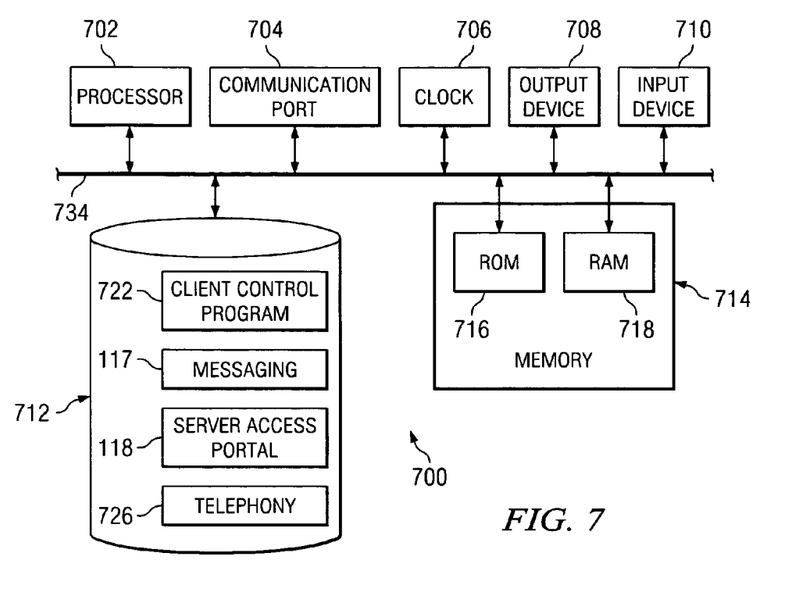
FIG. 7 is a block diagram of an exemplary user device according to an embodiment of the present invention.

Now referring to FIG. 7, a representative block diagram of a computer or processing device 700 suitable for use as a user device according to embodiments of the present invention is shown. In particular, the computer 700 may be a device suitable for setting one or more notification rules of the user and may implement the personal computer 110. In some embodiments, the computer 700 may include or operate a messaging client and a web browser or server access portal 118. The computer 700 may also include or interface to a telephony client. The computer 700 may be embodied as a single device or computer, a networked set or group of devices or computers, a workstation, mainframe or host computer, etc. In some embodiments, the computer 700 may implement one or more elements of the methods disclosed herein.

The computer 700 may include a processor, microchip, central processing unit, or computer 702 that is in communication with or otherwise uses or includes one or more communication ports or network interfaces 704 for communicating with user devices and/or other devices. The communication ports 704 may include such things as telephone adapters, local area network adapters, wireless communication devices, Bluetooth technology, etc. The computer 700 also may include an internal clock element 706 to maintain an accurate time and date for the computer 700, create time stamps for communications received or sent by the computer 700, etc.

If desired, the computer 700 may include one or more output devices 708 such as a printer, infrared or other transmitter, antenna, audio speaker, display screen or monitor, text to speech converter, etc., as well as one or more input devices 710 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the computer 700 may include a memory or data storage device 712 to store information, software, databases, documents, communications, device drivers, etc. The memory or data storage device 712 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. Thus, the storage device 712 may include various combinations of moveable and fixed storage. The computer 700 also may include memory 714, such as ROM 716 and RAM 718.

The processor 702 and the data storage device 712 in the computer 700 each may be, for example: (i) located entirely within a single computer or other computing device; or (ii) connected to each other by a remote communication medium, such as a serial port cable, telephone line or radio frequency transceiver. In one embodiment, the computer 700 may be implemented as one or more computers that are connected to a remote server computer, as will be explained in greater detail below.

A conventional personal computer or workstation with sufficient memory and processing capability may be used as the computer 700. The computer 700 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 702. Other suitable processors may be available from Motorola, Inc., AMD, or Sun Microsystems, Inc. The processor 702 also may be embodied as one or more microprocessors, computers, computer systems, etc.

Software may be resident and operating or operational on the computer 700. The software may be stored on the data storage device 712 and may include a client control program 722, a server access client, such as a browser 118, a messaging client 117, and a telephony client or interface 726.

The messaging client 724 may implement, for example, text or multi-media messaging, such as e-mail, or an Instant Messaging program, such as AOL Instant Messenger or Microsoft Instant Messaging. The server access portal 118 may implement a World Wide Web or Internet browser, such as Microsoft Explorer, Netscape Navigator, or Mozilla Firefox. The telephony client 726 may implement a telephony application or may interface to a separate telephone.

The client control program 722, server access portal 118, messaging client 724, and telephony client 726 may control the processor 702. The processor 702 may perform instructions of the control programs and clients, and thereby operate in accordance with the methods described in detail herein. The control programs and clients may be stored in a compressed, uncompiled and/or encrypted format. The control programs and clients furthermore include program elements that may be necessary, such as an operating system, a database management system and device drivers for allowing the processor 702 to interface with peripheral devices, databases, etc. Appropriate program elements are known to those skilled in the art, and need not be described in detail herein.

According to some embodiments, the instructions of the control program and clients may be read into a main memory from another computer-readable medium, such as from the ROM 716 to the RAM 718. Execution of sequences of the instructions in the control program causes the processor 702 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 702, communication ports 704, clock 706, output device 708, input device 710, data storage device 712, ROM 716 and RAM 718 may communicate or be connected directly or indirectly in a variety of ways. For example, the processor 702, communication ports 704, clock 706, output device 708, input device 710, data storage device 712, ROM 716 and RAM 718 may be connected via a bus 734.

While specific implementations and hardware/software configurations for the computer 700 have been illustrated, it should be noted that other implementations and hardware configurations are possible and that no specific implementation or hardware/software configuration is needed. Thus, not all of the components illustrated in FIG. 7 may be needed for the computer 800 implementing the methods disclosed herein.

Figure 8:
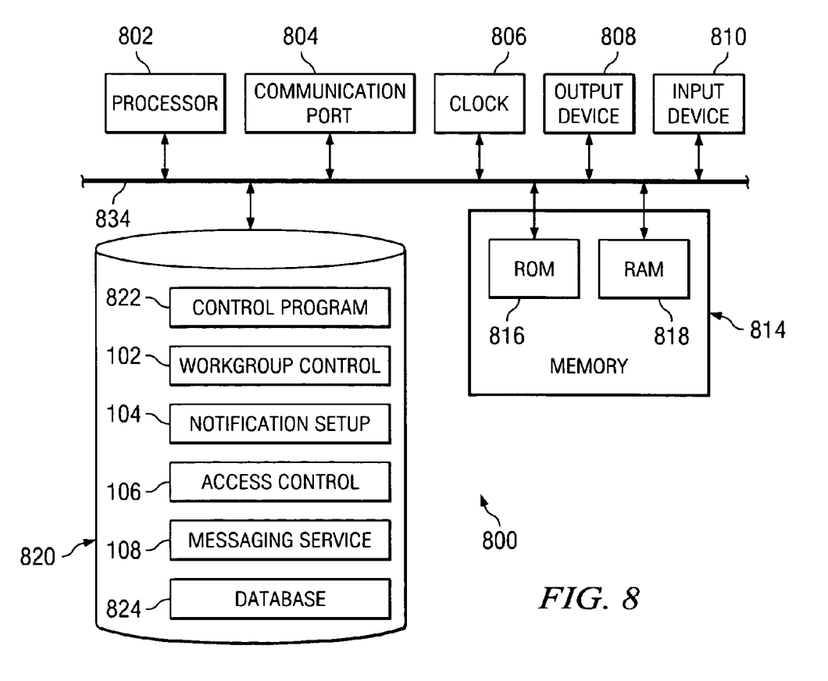
FIG. 8 is a block diagram of a server according to an embodiment of the present invention.

FIG. 8 is a diagram illustrating a server 800 according to embodiments of the present invention. The server 800 may be representative, for example, of the server of FIG. 1B. In some embodiments, the server 800 may include or operate a workgroup control unit 102, a notification setup unit 104, an access control unit 106, and one or more messaging services 108. The server 800 may be embodied as a single device or computer, a networked set or group of devices or computers, a workstation, mainframe or host computer, etc. In some embodiments, the server 800 may implement one more elements of the methods disclosed herein.

The server 800 may include a processor, microchip, central processing unit, or computer 802 that is in communication with or otherwise uses or includes one or more communication ports 804 for communicating with user devices and/or other devices. The communication ports 804 may include such things as local area network adapters, wireless communication devices, telephone network adapters, Bluetooth technology, etc. The server 800 also may include an internal clock element 808 to maintain an accurate time and date for the server 800, create time stamps for communications received or sent by the server 800, etc.

If desired, the server 800 may include one or more output devices 808 such as a printer, infrared or other transmitter, antenna, audio speaker, display screen or monitor, text to speech converter, etc., as well as one or more input devices 810 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 800 may include a memory or data storage device 820 to store information, software, databases, documents, communications, device drivers, etc. The memory or data storage device 820 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 800 also may include memory 814, such as ROM 818 and RAM 818.

The processor 802 and the data storage device 820 in the server 800 each may be, for example: (i) located entirely within a single computer or other computing device; or (ii)

connected to each other by a remote communication medium, such as a serial port cable, telephone line or radio frequency transceiver. In one embodiment, the server 800 may be implemented as one or more computers that are connected to a remote server computer for maintaining databases.

A conventional personal computer or workstation with sufficient memory and processing capability may be used as the server 800. The server 800 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 802. Other suitable processors may be available from Motorola, Inc., AMD, or Sun Microsystems, Inc. The processor 802 also may be embodied as one or more microprocessors, computers, computer systems, etc.

Software may be resident and operating or operational on the server 800. The software may be stored on the data storage device 820 and may include a control program 822 for operating the server, databases, etc. The control program 822 may include or interface to the workgroup control unit 102, a notification setup unit 104, an access control unit 108, and one or more messaging services 108, as well as other modules of FIG. 1B (not shown).

The control program and control units may control the processor 802. The processor 802 may perform instructions of the control programs, and thereby operate in accordance with the methods described in detail herein. The control program and control units may be stored in a compressed, uncompiled and/or encrypted format. The control program and control units furthermore includes program elements that may be necessary, such as an operating system, a database management system and device drivers for allowing the processor 802 to interface with peripheral devices, databases, etc. Appropriate program elements are known to those skilled in the art, and need not be described in detail herein.

The server 800 also may include or store information regarding identities, user devices, communications, outgoing notification messages, etc., in database(s) 824. Information regarding other application program data may be stored in application database (not shown). In some embodiments, some or all of one or more of the databases may be stored or mirrored remotely from the server 800.

According to some embodiments, the instructions of the control program may be read into a main memory from another computer-readable medium, such as from the ROM 818 to the RAM 818. Execution of sequences of the instructions in the control program causes the processor 802 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 802, communication ports 804, clock 808, output device 808, input device 810, data storage device 812, ROM 818, and RAM 818 may communicate or be connected directly or indirectly in a variety of ways. For example, the processor 802, communication ports 802, clock 808, output device 808, input device 810, data storage device 812, ROM 818, and RAM 818 may be connected via a bus 834.

While specific implementations and hardware/software configurations for the server 800 have been illustrated, it should be noted that other implementations and hardware configurations are possible and that no specific implementation or hardware/software configuration is needed. Thus, not all of the components illustrated in FIG. 8 may be needed for the server 800 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents

What is claimed is:

1. A telecommunications system, comprising:
   a notification set-up unit associated with a user device, wherein said user device is used by a first member of a workgroup, the workgroup comprising a plurality of members; and
   an access control unit receiving notification information from said notification set-up unit and automatically providing a notification to said user device whenever there is a pending conference for all members of the workgroup and the first member of the workgroup is not present in the pending conference in accordance with said notification information, the pending conference being a conference having already begun; and
   wherein said notification information identifies requirements for the pending conference.

2. The telecommunications system in accordance with claim 1, wherein said notification is provided by a messaging application.

3. The telecommunications system in accordance with claim 2, wherein said messaging application is an Instant Messaging application.

4. The telecommunications system in accordance with claim 2, wherein said messaging application is Short Message Service (SMS) application.

5. The telecommunications system in accordance with claim 1, wherein said notification set-up unit comprises a server.

6. The telecommunications system in accordance with claim 1, wherein said notification set-up unit receives the notification information from an input system, wherein the input system is a voice recognition input system.

7. The telecommunications system in accordance with claim 1, wherein said notification set-up unit receives the notification information from an input system, wherein the input system comprises an Interactive Voice Response (IVR) system for receiving a DTMF input or a voice input.

8. The telecommunications system in accordance with claim 1, wherein said access control unit is further configured to automatically attempt to add the user device to the conference after the notification has been sent.

9. A telecommunications method comprising:
providing notification setup parameters from a user device used by a first member of a workgroup to a notification setup unit, the workgroup having a plurality of members that comprises the first member and other members, the notification setup unit being stored on a non-transitory computer readable medium; and
automatically notifying said user device whenever there is a pending conference that already began to which all members of the workgroup are to be participating when the first member is not yet present in the pending conference via a messaging application in accordance with said notification setup parameters.

10. The telecommunications method in accordance with claim 9, wherein said messaging application is an Instant Messaging application.

11. The telecommunications method in accordance with claim 9, wherein said messaging application is Short Message Service (SMS) application.

12. The telecommunications method in accordance with claim 9, wherein said providing notification setup parameters comprises providing notification setup parameters via a server.

13. The telecommunications method in accordance with claim 9, wherein said providing notification setup parameters comprises providing notification setup parameters via an input system, wherein the input system is a voice recognition input system.

14. The telecommunications method in accordance with claim 9, wherein said providing notification setup parameters comprises providing notification setup parameters via an IVR system for receiving a DTMF input or a voice input.

15. The telecommunications method in accordance with claim 9, further comprising automatically attempting to add the user device to the conference after a notification for notifying of the user device has been sent.

16. A method of telecommunication comprising:
defining a workgroup, the workgroup comprising a plurality of members, each of the members associated with at least one user device;
at least one user device associated with a first member of the workgroup sending notification parameters to a notification setup unit, the notification setup unit having a non-transitory computer readable medium;
the notification setup unit receiving the notification parameters sent by the at least one user device associated with the first member;
storing the notification parameters;
initiating a conference with all the members of the workgroup;
a telephony control unit attempting to connect the workgroup to the conference; and
if the first member associated with the at least one user device is not connected to the conference:
a messaging service sending a message to be output at a specified contact device associated with the first member, the message being sent according to the notification parameters sent by the at least one user device.

17. The method of claim 16 further comprising automatically connecting the at least one user device to the conference upon acknowledgment of the message.

18. The method of claim 16 wherein the notification setup unit is a server, the telephony control unit is a server, and the messaging service is a server.

19. The method of claim 16 wherein the notification parameters comprise at least one of a contact medium, a place for a call back, a call back time, and a contact number for the specified contact device.

20. The method of claim 16 wherein the specified contact device and the at least one user device are different devices or are the same device.

* * * * *